Patented May 27, 1930

1,760,788

UNITED STATES PATENT OFFICE

HEINRICH SPECKETER AND GEORG HENSCHEL, OF GRIESHEIM-ON-THE-MAIN, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF CHROMATES WITH SIMULTANEOUS RECOVERY OF ALUMINA

No Drawing. Application filed June 23, 1927, Serial No. 201,016, and in Germany July 1, 1926.

This invention relates to the production of sodium chromate. Hitherto this salt was generally produced by heating a chrome ore, such as chromite, mixed with soda ash and additions of lime, dolomite, magnesite, residues from chrome ores or the like, which additions serve to produce a porous condition of the mass, at a temperature of 1000—1200° C., for some time in an oxidizing atmosphere. In this case the additions serve merely to absorb the sodium chromate formed which melts at a considerably lower temperature than the reaction temperature whereby the charge of the furnace is maintained in pulverulent, porous condition. Under these conditions the unconsumed part of the chrome ore cannot become coated with a molten layer of chromate, which would result in preventing any further action of the oxygen upon the chrome ore. After complete conversion of the chrome ore the charge is extracted with water and the solution of the chromate or bichromate further treated to obtain a commercial product, whereas the diluent employed together with the residues of the chrome ore are either discarded or again used for a further batch.

An object of our present invention is to employ a diluent which, on being treated together with the chrome ore, will yield a valuable by-product instead of using substances which are of no use after having served in the process and besides occasion considerable expense to remove. According to our invention bauxite or similar substances rich in alumina, hereafter included in the term "bauxite," are employed for this purpose, a further amount of soda ash corresponding to the quantity of bauxite being added, whereby the chrome ore and the bauxite are simultaneously extracted in one operation. This process is made practicable by the fact that the product resulting from the reaction between soda ash and alumina, viz: sodium aluminate, at the working temperature of about 900—1000° C. acts as a diluent in the same manner as the raw bauxite before it reacts. This action of the aluminate could not be expected a priori; the fact, however, that the sodium aluminate exerts no action of any sort upon the fusing point of the chromate, for instance, by forming eutectics having a lower fusing point, renders the process practicable.

The action proceeds comparatively quickly and therefore can be carried out continuously in a rotary drum or plate furnace. After the reaction has been completed the charge is extracted with water or washing liquors. Here the first advantage of our process comes to light as compared with the use of the inert diluents hitherto used inasmuch as the aluminate is dissolved together with the chromate, so that only the insoluble portions of the chrome ore and bauxite are left as residue which constitutes only a small percentage of the amount of residue hitherto obtained.

The extraction results in a solution containing sodium chromate and sodium aluminate besides smaller quantities of sodium silicate and caustic soda and, when an excess of soda ash is employed, remnants of this salt. Preferably solutions are aimed at, of which the specific gravity measured hot approximates 1.26. Then we proceed first by maintaining the solution for some time at a temperature of at least 100° C.; when employing closed vessels the solution may be heated to a temperature considerably above the boiling-point of the solution at atmospheric pressure. During this time the sodium silicate reacts with a certain quantity of alumina whereby the silicic acid is almost completely separated in the form of sodium-aluminum silicate. After removal of this product the alumina may be stirred out and the separation completed by introducing carbon dioxide. A quicker and simpler method of working up the solution consists in first treating same with carbon dioxide or combustion gases. The alumina is then filtered off and washed out; it is free from iron to a greater extent than required for the production of aluminum, for instance, and also contains silicic acid in a quantity not exceeding the prescribed limits. Hereupon the solution of soda ash and chromate is concentrated by evaporation, whereby the bulk of the sodium carbonate is precipitated. The latter may immediately be used for the next extraction, without further treatment except drying, if desired. The chromate solution still containing a small amount of sodium carbonate may be subjected to crystallization to obtain the chromate; preferably the solution is acidified in the usual way to obtain at once a bichromate. When sulfuric acid is employed for this purpose, the separated sodium sulfate may be filtered off by suction in the well known manner.

The proportions of chrome ore and bauxite employed in the reaction mixture may be varied within wide limits. It is thus possible to adapt the output of the final products obtained in the present process to the actual demands of the market. Of course, the lower limit depends upon the minimum amount needed for maintaining the mass in a pulverulent state. With normal chrome ores containing, for instance, 49.5% of $Cr_2O_3$ this minimum is about 120 parts of a dried bauxite containing about 60% of $Al_2O_3$ per 100 parts of chrome ore. An upper limit is practically attained by adding about 190 parts of the bauxite to 100 parts of the chrome ore mentioned above. However, the limits may in some cases be extended, for instance, when there is a greater demand for alumina than for chromates.

Our improved process offers a further advantage inasmuch as the output of alumina in view of the alumina contents of the bauxite employed exceeds 100% in the most cases when the chrome ores containing from 10 to 20% of alumina which frequently occur are employed and, on the other hand, the silica contents of the ores are within moderate limits. In extracting bauxite with soda ash in the manner hitherto usual an output of 90 per cent of alumina is generally considered a maximum. This advantage of obtaining an alumina output of more than 100% is due to the fact that the silicic acid of the raw materials cannot combine with more $Al_2O_3$ than corresponds to the ratio of about 1 mol. of $Al_2O_3$ to 2 mol. of $SiO_2$ and to the fact that this small loss is largely overcompensated by the quantity of alumina produced by the extraction of the $Al_2O_3$-contents (furnished free of cost) of the chrome ore. Our improved process therefore does not involve the mere exchange of two inert diluents nor a mere aggregation of two processes independent of each other, but is based upon the utilization of the distinct advantages which the chromate process acquires by combining it with the extraction of bauxite. These advantages are:

1. The major quantity of the diluent employed is converted into a soluble compound.
2. A valuable by-product instead of a waste product is obtained from the diluent employed.
3. The output is increased as compared with the usual bauxite extraction which is always connected with a certain loss of alumina.

Before explaining the following examples we remark that when calculating the amount of soda ash required secondary reactions must be taken into consideration because without providing soda ash for these secondary reactions the maximum outputs can not be realized. With chrome ores some lime may be added besides the bauxite, the lime combining with silicic acid and alumina and going into the residue.

*Example 1*

1000 parts of chrome ore containing 49.4% $Cr_2O_3$, 13.04% $Al_2O_3$, 6.7% $SiO_2$, 16.88% FeO, 13.33% MgO, dried at 100° C., 1200 parts of bauxite containing 57.45% $Al_2O_3$, 22.85% $Fe_2O_3$, 2.0% $SiO_2$, 2.7% $TiO_2$, 2.0% $Mn_2O_3$, 13.4% $H_2O$, dried at 105° C., and 2200 parts of soda ash (98.5% $Na_2CO_3$) are mixed and introduced into a suitable furnace, for instance, a plate furnace with rotary hearth, and kept at 900–1000° C. by means of a suitable gas heater while maintaining a strongly oxidizing atmosphere. When, after about 4 hours treatment, the reaction is completed the charge is extracted.

*Example 2—showing an increased output of alumina in comparison to chromate*

1000 parts of the above-mentioned chrome ore, 3060 parts of the above-mentioned bauxite, and 4210 parts of soda ash are mixed and treated as described in Example 1. Whereas in continuous working as per Example 1 60–65 parts of alumina are obtained per 100 parts of bichromate, in the present example 150–160 parts of marketable alumina are recovered per 100 parts of sodium bichromate.

We claim:—
1. The process of producing sodium chromate with simultaneous recovery of alumina, which comprises the steps of subjecting a mixture of a chrome ore and bauxite with the amount of soda ash required for forming chromates, aluminates and ferrates in an oxidizing atmosphere to a temperature of about 900–1000° C., extracting the hot mass with water to produce a solution of about 1.26 specific gravity, keeping the said solution at a temperature of at least 100° C. until the separation of the silicic acid in form of sodium-aluminum silicate is completed, filtering off the solution, precipitating the alumina from the latter by carbonic acid, filtering off the sodium carbonate and chromate solution, concentrating the same until the main quantity of sodium carbonate is separated, filtering off the chromate solution and separating the chromate therefrom.

2. In a process for the simultaneous production of sodium chromate and alumina, the step which comprises subjecting a mixture of a chrome ore, bauxite and the amount of soda ash required for forming chromates, aluminates and ferrates, in an oxidizing atmosphere at a temperature of about 900–1000° C.

3. Process in accordance with claim 1, which comprises heating the aqueous extract in closed vessels to a temperature which is kept above the boiling-point of the extract at atmospheric pressure, to accelerate and complete the separation of sodium-aluminum silicate, filtering off the solution, and separating the alumina and the sodium carbonate and chromate therefrom.

In testimony whereof we affix our signatures.

HEINRICH SPECKETER.
GEORG HENSCHEL.